US006224938B1

(12) United States Patent
Bamba et al.

(10) Patent No.: US 6,224,938 B1
(45) Date of Patent: May 1, 2001

(54) METHOD FOR PRODUCING FOAMED PRESSURE-SENSITIVE ADHESIVE TAPE OR SHEET

(75) Inventors: Tomohide Bamba; Takayuki Yamamoto; Tomohiro Taruno; Mitsuhiro Kanada; Yoshihiro Minamizaki, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/456,910

(22) Filed: Dec. 7, 1999

(30) Foreign Application Priority Data

Dec. 8, 1998 (JP) .................................................. 10-348055

(51) Int. Cl.⁷ ....................................................... B05D 1/00
(52) U.S. Cl. ...................... 427/208.4; 427/244; 427/420; 427/434.2
(58) Field of Search ................................. 427/208.4, 244, 427/434.2, 420; 118/50, DIG. 4

(56) References Cited

U.S. PATENT DOCUMENTS 3,673,126 * 6/1972 Carmody et al. .

OTHER PUBLICATIONS

Database WPI, Section Ch, Week 199620, Derwent Publications Ltd., London, GB: AN 1996–196697, XP002147433 & JP 08 067861 A (Nichiban KK), Mar. 12, 1996, *abstract*.

* cited by examiner

Primary Examiner—Bernard Pianalto
(74) Attorney, Agent, or Firm—Sughrue, Mion, Zinn, Macpeak & Seas, PLLC

(57) ABSTRACT

A method and apparatus for producing a foamed pressure-sensitive adhesive tape or sheet having a fine cell structure with a good production efficiency without through complicated steps are provided.

The method comprises subjecting a mixture containing monomers of a polymer constituting a foamed pressure-sensitive adhesive layer to polymerization in an inert fluid in a supercritical state or a liquid state under pressure, and ejecting the polymerized composition obtained on a substrate under a pressure lower than the pressure in the polymerization to form a foamed pressure-sensitive adhesive layer applied on the substrate.

The apparatus comprises a pressure vessel for polymerizing monomers of a polymer constituting a foamed pressure-sensitive adhesive layer under pressure, an inert fluid supplying means for supplying an inert fluid in a supercritical state or a liquid state to the pressure vessel, and an ejection means for ejecting the polymerized composition obtained by polymerizing the monomers.

3 Claims, No Drawings

United States Patent number US 6,224,938 B1.

METHOD FOR PRODUCING FOAMED PRESSURE-SENSITIVE ADHESIVE TAPE OR SHEET

FIELD OF THE INVENTION

The present invention relates to a method for producing a foamed pressure-sensitive adhesive tape or sheet having a foamed pressure-sensitive adhesive layer containing fine foams and an apparatus for producing the same.

BACKGROUND OF THE INVENTION

It has been conducted that by making a pressure-sensitive adhesive layer of pressure-sensitive adhesive tapes or sheets be a fine foamed structure, an apparent modulus of elasticity is decreased to improve properties such as an initial pressure-sensitive adhesive property, adhesive property to a rough surface or repulsion resistance, and the amount of a pressure-sensitive adhesive used is decreased to reduce a material cost.

Conventional methods for producing the above-described foamed pressure-sensitive adhesive tape or sheet include a method of incorporating a thermal decomposition type chemical foaming agent into a pressure-sensitive adhesive layer followed by heating as disclosed in, for example, JP-A-62-263278) (the term "JP-A" as used herein means an "unexamined published Japanese patent application"), and a method of intermixing fine hollow particles such as microcapsules in a pressure-sensitive adhesive layer as disclosed in, for example, JP-A-2-240182. However, those methods have involved various problems such that the foaming agent or fine hollow particles are difficult to uniformly disperse, fine cells are difficult to obtain, it is difficult to control the foamed cell structure, and a cost increases.

JP-A-8-199125 discloses a method foaming the pressure-sensitive adhesive layer by placing an existing pressure-sensitive adhesive sheet under a high pressure gas atmosphere to dissolve the atmospheric gas therein and then releasing the pressure. However, this method can form a fine cell structure, but the conventional production steps of a pressure-sensitive adhesive sheet, such as coating and drying the pressure-sensitive adhesive, remain unchanged, and in addition to this, a foaming step is necessary. As a result, the steps become complicated, and the cost is unavoidably increased as compared with the production cost of the conventional pressure-sensitive adhesive sheet. Also, since the foaming step is mainly carried out in a high-pressure room of a batch system, this method is very disadvantageous from the standpoint of a continuous productivity.

SUMMARY OF THE INVENTION

Accordingly, one object of the present invention is to provide a method for producing a foamed pressure-sensitive adhesive tape or sheet having a fine cell structure with a good production efficiency without through complicated steps.

Another object of the present invention is to provide an apparatus for producing the foamed pressure-sensitive tape or sheet.

As a result of various investigations to attain the above-described objects, it has been found that if monomers of a polymer constituting a pressure-sensitive adhesive layer are polymerized under specific conditions and a layer of the resulting polymer is applied on a substrate under specific conditions, not only the problems in the conventional method using a chemical foaming agent, etc., can be overcome but also a foamed pressure-sensitive adhesive tape or sheet is obtained with a good productivity by simple steps as compared with the method of using a high pressure gas described in the above-described patent publication. The present invention has been completed based on this finding.

According to one embodiment of the present invention, there is provided a method for producing a pressure-sensitive adhesive tape or sheet having a foamed pressure-sensitive adhesive layer, which comprises polymerizing a mixture containing monomers of a polymer constituting the foamed pressure-sensitive adhesive layer under pressure in an inert fluid of a supercritical state or a liquid state, and then ejecting the polymerized composition obtained on a substrate under a pressure lower than the above-described pressure to form a foamed pressure-sensitive adhesive layer applied on the substrate.

According to another embodiment of the present invention, there is provided an apparatus for producing a foamed pressure-sensitive adhesive tape or sheet, which comprises a pressure vessel for polymerizing monomers of a polymer constituting a foamed pressure-sensitive adhesive layer under pressure, an inert fluid supplying means for supplying an inert fluid in a supercritical state or a liquid state to the pressure vessel, and an ejection means for ejecting the polymerized composition obtained by polymerizing the monomers.

DETAILED DESCRIPTION OF THE INVENTION

The present invention is described in detail below.

According to the method of the present invention, a mixture of the monomers of the polymer constituting the foamed pressure-sensitive adhesive layer is polymerized under pressure in an inert fluid in a supercritical state or a liquid state.

The polymer used is not particularly limited so long as it can be used as a pressure-sensitive adhesive. Examples of the polymer include acrylic polymers and rubber-based polymers. Of those, acrylic polymers such as acrylic acid ester copolymers are preferable, and examples thereof include a copolymer of at least two kinds of acrylic acid ester monomers and a copolymer comprising at least an acrylic acid ester monomer and a function group-containing unsaturated monomer as the monomer components.

Examples of the acrylic acid ester monomer include acrylic acid $C_{1-10}$ alkyl esters such as methyl acrylate, ethyl acrylate, n-butyl acrylate, isobutyl acrylate, 2-ethylhexyl acrylate, isooctyl acrylate or isononyl acrylate. However, the acrylic acid ester monomers used in the present invention are not limited to those monomers.

Examples of the functional group-containing unsaturated monomer include carboxyl-containing monomers such as acrylic acid, methacrylic acid or itaconic acid, acid anhydride-containing monomers such as maleic anhydride, monomers having a nitrogen-containing group (an amide group, a cyano group, an amino group, etc.), such as acrylamide, acrylonitrile or dimethylaminoethyl methacrylate, hydroxyl-containing monomers such as hydroxyethyl acrylate or hydroxyethyl methacrylate, and epoxy group-containing monomers such as glycidyl acrylate. However, the monomers are not limited to those.

The acrylic acid copolymer may further contain vinyl esters such as vinyl acetate, aromatic vinyl compounds such as styrene or vinyltoluene, methacrylic acid esters such as methyl methacrylate or ethyl methacrylate, as other monomer component other than the above-described monomers.

The mixture containing the above monomers may contain additives usually added to pressure-sensitive adhesives, such as a tackifier resin, a softening agent, an antioxidant or a filler.

The polymerization method is not particularly limited so long as the polymerization can be carried out in an inert fluid. Example of the polymerization method includes a free radical polymerization method using the conventional radical initiator, for example, an azo-based radical initiator such as 2,2'-azobisisobutyronitrile, or a peroxide-based radical initiator such as benzoyl peroxide.

The inert fluid that can be used in the present invention can be any substances that are gas at ordinary temperature and atmospheric pressure, and also are inert under the polymerization conditions. Examples of the inert fluid include rare gases such as helium or argon, and inorganic gases such as nitrogen or carbon dioxide. Of those, carbon dioxide can most suitably be used in that carbon dioxide has a relatively high affinity for high molecular weight materials in a supercritical state or a liquid state, does not almost adversely affect the environment, and is advantageous in cost.

The pressure in polymerization is under pressure (particularly, under high pressure) and can appropriately be selected from the range of, for example, from about 1 MPa to 40 MPa according to the kind of the inert fluid used. For example, where carbon dioxide is used as the inert fluid, the pressure is preferably in the range of from about 5 MPa to 40 MPa.

The polymerization temperature can also be appropriately selected according to the kind of the inert fluid used. Where carbon dioxide, for example, is used as the inert fluid, the polymerization temperature is preferably in the range of from about 20° C. to 100° C. Further, the temperature may be changed locally in the same apparatus. For example, where carbon dioxide, for example, is used, the temperature at the polymerizing portion is suitably in the range of from 20° C. to 100° C., and the temperature at the ejecting portion of the polymerized composition is suitably from about 10° C. to 100° C.

In the method of the present invention, the polymerized composition obtained by the polymerization is ejected in the form of a thin layer on a substrate under a pressure lower than the pressure at the polymerization and applied thereon to form a foamed pressure-sensitive adhesive layer.

The substrate can be any substrates that are usually used for pressure-sensitive adhesive tapes. Examples of the substrate include papers such as Japanese papers or Kraft papers, non-woven fabrics, and plastic films made of a polyolefin-based resin, a polyester-based resin, a vinyl chloride-based resin or the like. The thickness of the substrate is not particularly limited and can appropriately be selected considering the handling property, etc.

The pressure in applying the polymerized composition on the substrate must be lower than the pressure at the polymerization, but is preferably an atmospheric pressure from the point of the operability.

Foaming of the pressure-sensitive adhesive layer occurs by that in applying the polymerized composition (pressure-sensitive adhesive) on the substrate, the moment the pressure-sensitive adhesive is ejected from a high pressure side, the inert fluid impregnated and saturated in the polymerize composition at the polymerization forms foam nuclei and then immediately grows into gas bubbles. Accordingly, the method of the present invention makes it possible to simultaneously carry out the application of the pressure-sensitive adhesive and the foaming thereof, whereby the production steps are simplified.

The method of the present invention can be practiced by the apparatus for producing a foamed pressure-sensitive adhesive tape or sheet, comprising a pressure vessel (high-pressure vessel) for polymerizing monomers of the polymer constituting the foamed pressure-sensitive adhesive layer under pressure, an inert fluid supplying means for supplying an inert fluid in a supercritical state or a liquid state to the pressure vessel, and an ejection means for ejecting the polymerized composition (pressure-sensitive adhesive) obtained by the polymerization.

The pressure vessel is not particularly limited so long as the vessel can carry out a polymerization under pressure, and the pressure vessel may be, for example, a batch-type pressure vessel or an extrusion apparatus having a pressure resistance. The inert gas supplying means can be constituted of a pump, pipings, valves, etc. Examples of the ejection means include dies such as a T-die or a fish tale die, but the ejection means is not particularly limited so long as the means has a structure capable of ejecting a pressure-sensitive adhesive as a thin layer.

Where a batch type vessel is used as the apparatus used in the present invention, it is preferred to further dispose a valve for opening and shutting the ejection means such as a die. In this case, after preparing the pressure-sensitive adhesive in the state of shutting the valve, the pressure-sensitive adhesive is ejected from the ejection means such as a die using the pressure difference between the inside and the outside of the apparatus as an impulsion by the operation of releasing the valve and the foamed pressure-sensitive adhesive is applied on the substrate. The ejection speed of the pressure-sensitive adhesive can be controlled by the degree of opening and shutting of the valve.

Where an extrusion apparatus is used as the apparatus used in the present invention, for example, a pressure-sensitive adhesive raw materials made of a raw material monomer, an initiator, etc., and a pressurized inert fluid are continuously supplied to the extrusion apparatus to continuously polymerize the monomer in the extrusion apparatus, the pressure-sensitive adhesive obtained is continuously extruded as a thin layer by an ejection means such as a die equipped to the tip of the extrusion apparatus, and the foamed pressure-sensitive adhesive is applied on a substrate. Thus, use of the extrusion apparatus enables a production process to continuously carry out the steps of raw material supply-polymerization-foaming-application, and therefore is suitable for the production method of a foamed pressure-sensitive adhesive tape or sheet.

According to the present invention, after preparing the pressure-sensitive adhesive by polymerization in a pressure vessel, foaming of the pressure-sensitive adhesive thus obtained and the application of the pressure-sensitive adhesive on a substrate can simultaneously be carried out using an ejection means such as a die equipped to the vessel as it is, so that it is not necessary to use an additional foaming step as conventionally used.

Further, as compared with the production process of a conventional solvent-type or emulsion-type pressure-sensitive adhesive, the method of the present invention can omit a heat-drying step of a pressure-sensitive adhesive, which has conventionally been necessary, can be omitted. As a result, the production process can be greatly simplified.

Furthermore, according to the method of the present invention, in ejecting the pressure-sensitive adhesive to a low-pressure region, the residual monomer and low molecular weight components, which have a possibility to lower the pressure-sensitive adhesive properties, can be evaporated off simultaneously with the evaporation of the inert fluid. As a result, high performance-pressure-sensitive adhesive properties can be realized without carrying out a specific purification step.

The foamed pressure-sensitive adhesive tape obtained by the method of the present invention is that the pressure-sensitive adhesive layer has a finely foamed structure. As a result, the apparent modulus of elasticity lowers, whereby the pressure-sensitive adhesive tape are excellent in the properties such as an initial pressure-sensitive adhesive property, an adhesive property to rough surface, a repulsion resistance, etc. Further, since the amount of the pressure-sensitive adhesive used can be decreased, the cost for the materials can be reduced.

The present invention is described in more detail by reference to the following examples, but it should be understood that the invention is not limited thereto.

EXAMPLE 1

In a batch-type pressure vessel equipped with a T-die and a valve at the lower portion of the vessel, 100 parts by weight of a butyl acrylate monomer, 5 parts by weight an acrylic acid monomer and 0.1 part by weight of 2,2'-azobisbutyronitrile were placed. After stirring the resulting mixture, pressurized carbon dioxide was introduced into the vessel to conduct a free radical polymerization for 4 hours under the conditions of a pressure of 25 MPa and a temperature of 65° C.

The pressure-sensitive adhesive thus obtained was ejected in a thin layer from the T-die by opening the valve equipped to the lower portion of the pressure vessel and applied on a polyethylene terephthalate (PET) film having a thickness of 40 $\mu$m to prepare a foamed pressure-sensitive adhesive tape having a foamed pressure-sensitive adhesive layer, having a thickness of 250 $\mu$m.

The pressure-sensitive adhesive tape prepared was press-adhered on a stainless steel plate by once reciprocating a roller of 1 kg. After allowing the tape thus adhered to stand for 30 minutes at room temperature, a 180° peel test was conducted to evaluate the adhesive force of the pressure-sensitive adhesive tape to the stainless steel plate. Similarly, the pressure-sensitive adhesive tape prepared was press-adhered on a #400 sand paper by once reciprocating of a roller of 1 kg. After allowing the tape thus adhered to stand for 30 minutes at room temperature, a 180° peel test was conducted to evaluate the adhesive force of the pressure-sensitive adhesive tape to the rough surface. The evaluation results are shown in Table 1 below.

COMPARATIVE EXAMPLE 1

A pressure-sensitive adhesive was prepared in the same manner as in Example 1. The pressure-sensitive adhesive was not ejected from the die but the pressure in the pressure vessel was lowered to the atmospheric pressure, and the pressure-sensitive adhesive was taken out of the vessel. The pressure-sensitive adhesive was dissolved in toluene to form a pressure-sensitive adhesive solution, and the solution was coated on a PET film having a thickness of 40 $\mu$m and dried in an oven at 80° C. for 10 minutes to prepare a pressure-sensitive adhesive tape having a foam-less pressure-sensitive adhesive layer, having a thickness of 250 $\mu$m.

The pressure-sensitive adhesive tape thus prepared was evaluated for the adhesive force to the stainless steel plate and the adhesive force to the rough surface in the same methods as in Example 1. The evaluation results are shown in Table 1 below.

TABLE 1

| | Adhesive force to stainless steel plate (N/10 mm) | Adhesive force to rough surface (N/10 mm) |
|---|---|---|
| Example 1 | 16.0 | 4.21 |
| Comparative Example 1 | 13.1 | 3.63 |

EXAMPLE 2

In a batch-type pressure vessel equipped with a T-die and a valve at the lower portion of the vessel, 100 parts by weight of a butyl acrylate monomer, 5 parts by weight an acrylic acid monomer and 0.2 part by weight of 2,2'-azobisbutyronitrile were placed. After stirring the resulting mixture, pressurized carbon dioxide is introduced into the vessel to conduct a free radical polymerization for 4 hours under the conditions of a pressure of 20 MPa and a temperature of 65° C.

The pressure-sensitive adhesive thus obtained was ejected in a thin layer from the T-die by opening the valve equipped to the lower portion of the pressure vessel and applied on a PET film having applied on the surface thereof silicone coating to prepare a foamed pressure-sensitive adhesive layer, having a thickness of 300 $\mu$m. Further, an aluminum plate having a thickness of 400 $\mu$m was adhered to the foamed pressure-sensitive adhesive layer to prepare a foamed pressure-sensitive adhesive tape having the aluminum plate as a substrate.

The aluminum/foamed pressure-sensitive adhesive tape thus prepared was subjected to a repulsion resistance evaluation test by the following procedure.

The aluminum/foamed pressure-sensitive adhesive tape was cut into a size of 10 mm×90 mm. After bending the cut tape at a curvature of R50 with the pressure-sensitive adhesive layer being outside, the silicone coated PET film was released, and the tape was press-adhered to an acrylic resin plate using a laminator such that rising did not occur. After allowing the assembly to stand for 24 hours at room temperature, the assembly was heated in an oven at 70° C. for 2 hours, and the distance of the rise from the acrylic resin plate at both ends of the cut tape was measured. The evaluation results obtained are shown in Table 2 below.

COMPARATIVE EXAMPLE 2

A pressure-sensitive adhesive was prepared in the same manner as in Example 2, the pressure-sensitive adhesive was not ejected from the die but the pressure in the pressure vessel was lowered to the atmospheric pressure, and the pressure-sensitive adhesive was taken out of the vessel. The pressure-sensitive adhesive was dissolved in toluene to form a pressure-sensitive adhesive solution, and the solution was coated on a PET film having applied on the surface thereof silicone coating and dried in an oven at 80° C. for 10 minutes to form a foam-less pressure-sensitive adhesive layer having a thickness of 300 $\mu$m. An aluminum plate having a thickness of 400 $\mu$m was adhered to the pressure-sensitive adhesive layer to prepare a pressure-sensitive adhesive tape having the aluminum plate as a substrate.

The aluminum/pressure-sensitive adhesive tape was subjected to the repulsion resistant evaluation test in the same manner as in Example 2. The evaluation results obtained are shown in Table 2 below.

TABLE 2

| | Repulsion resistance evaluation (Rising distance) | |
|---|---|---|
| | One end | Other end |
| Example 2 | 2.5 mm | 2.5 mm |
| Comparative Example 2 | 14.0 mm | 5.5 mm |

What is claimed is:

1. A method for producing a foamed pressure-sensitive adhesive tape or sheet having a foamed pressure-sensitive adhesive layer, which comprises polymerizing a mixture containing monomers of a polymer constituting the foamed pressure-sensitive adhesive layer under pressure in an inert fluid in a supercritical state or a liquid state, and then ejecting the polymerized composition obtained on a substrate under a pressure lower than the pressure in the polymerization to form a foamed pressure-sensitive adhesive layer applied on the substrate.

2. The method as claimed in claim 1, wherein the polymer constituting the foamed pressure-sensitive adhesive layer is an acrylic acid ester copolymer.

3. The method as claimed in claim 1, wherein the inert fluid is carbon dioxide.

* * * * *